Dec. 16, 1952     D. T. STREET     2,621,410
GUN TELESCOPE MOUNTING
Filed April 13, 1949
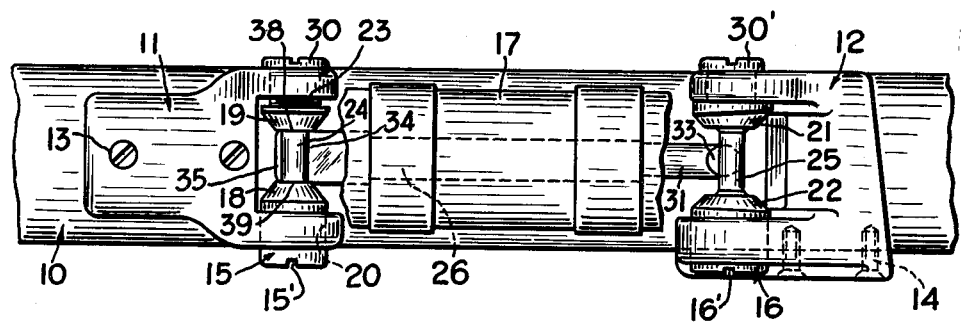
FIG. 2
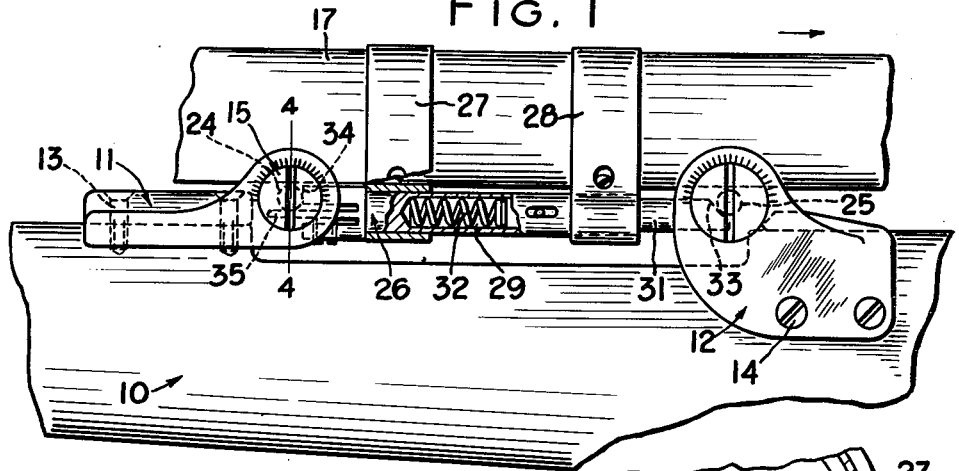
FIG. 1
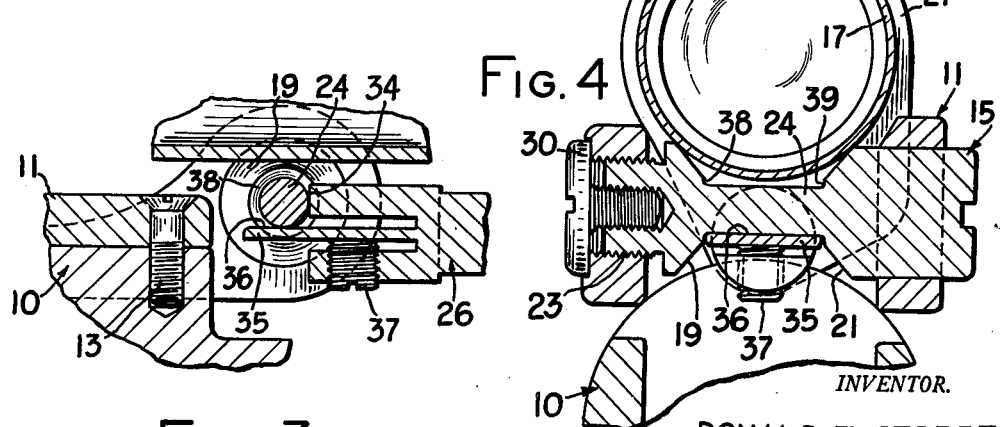
FIG. 4
FIG. 3
INVENTOR.
BY DONALD T. STREET Patented Dec. 16, 1952

2,621,410

UNITED STATES PATENT OFFICE 2,621,410

GUN TELESCOPE MOUNTING

Donald T. Street, Brighton, N. Y., assignor to Bausch & Lomb Optical Company, Rochester, N. Y., a corporation of New York Application April 13, 1949, Serial No. 87,234

3 Claims. (Cl. 33—50)

This invention relates to improvements in gun telescope mountings and more particularly it relates to clamping and alignment means whereby a telescope which is detachably secured to a gun is held thereon in proper alignment even though adjustments of the telescope are made to compensate for windage or elevation.

In developing a gun telescope mounting of the adjustable type which incorporates yieldable clamping means for the telescope, difficulty is experienced in keeping the line of sight of the telescope coincident with its predicted position when the windage and elevational adjustments are made.

It is an object of this invention to provide a gun telescope mounting, having windage and elevation adjustments, with novel means for detachably holding a telescope in proper alignment with a gun on which it is mounted.

It is another object to provide such a device which will prevent the telescope from becoming accidentally misplaced in either a rotational, longitudinal, or vertical direction when elevation or windage adjustments are made.

Other objects and advantages reside in the novel details of construction and combination of parts as described in the following specification and shown in the accompanying drawing in which:

Fig. 1 is a side view of a preferred form of my gun telescope mounting showing it in use, Fig. 2 is a top view thereof with parts of the telescope broken away, Fig. 3 is an enlarged vertical sectional view of the front mount showing details of construction, and Fig. 4 is an enlarged sectional view taken on the line 4—4 of Fig. 1.

The herein disclosed seating members for adjustably supporting a telescope are the subject matter of my co-pending application for United States patent Serial No. 21,349, filed April 16, 1948.

In Fig. 1, there is shown the breech 10 of a gun on which a front bracket 11 and a rear bracket 12 are fixed by suitable means such as screws 13 and 14, respectively. Seating members 15 and 16 for receiving a telescope 17 are rotatably mounted for adjustment purposes in the brackets 11 and 12, respectively, and are provided with conical seating surfaces 18, 19 and 21, 22, respectively, on which the telescope rests. The conical seating surfaces 18 and 19 are connected by a cylindrical neck portion 24 and the axes of the surfaces are concentric with the axis of the rotatable member 15. The end 20 of the member 15 is journaled in bracket 11 while the other end is threaded into bracket 11 as at 23. A lateral or windage adjustment of the telescope 17 may, accordingly, be effected by rotating the member 15 by means of a coin or blade which is inserted in slot 15'. The conical seating surfaces 21, 22 on the seating member 16 are formed as radial, spirally curved surfaces so that rotation of the member 16 by means of a coin or blade in slot 16' causes the telescope 17 to move vertically to effect adjustments for elevation. The conical seating surfaces 21 and 22 are connected by a cylindrical neck 25 whose axis of rotation is concentric with the axis of rotation of said member 16. To secure the seating members 15 and 16 in adjusted position, lock screws 30 and 30', threaded respectively therein and bearing against their respective brackets 11 and 12, are provided.

Yieldable attaching means are provided for the telescope 17 comprising a rod-like anchor member 26 which is fixedly secured to the telescope in any preferred manner, as by a pair of straps 27, 28. One end of the anchor member 26 is bored as at 29 to receive a locking plunger 31 having a beveled end 33 which is urged by a spring 32 against the neck 25 for locking the telescope in place on its seating member 16 by its camming action. A substantially vertical surface 34 on the forward end of the anchor member 26 is urged, by the action of spring 32, against the neck 24 so as to locate the telescope 17 longitudinally on the gun and to transmit the shock of recoil to the telescope without transmitting any undesirable transverse stresses thereto.

An essential feature of this invention is the clamping means which is formed on the forward end of the anchor member 26 and is preferably constructed as a blade 35 extending from the anchor member and located below the surface 34. The blade 35 has a broad upper contact surface 36 adapted to firmly engage the underside of the cylindrical neck 24 to hold the telescope 17 firmly onto seating member 15 so as to prevent vertical movement of the telescope. The blade 35 is preferably slightly resilient, and, as shown in Figs. 3 and 4, it is pressed upwardly against the neck 24. An adjusting screw 37, threaded into the anchor member 26 beneath the blade 35 and bearing thereon, is provided for varying the clamping pressure between the blade 35 and neck 24.

In order to prevent the telescope 17 from tending to rotate when windage adjustments are made to the telescope, the ends of the cylindrical neck are provided with vertical shoulders 38 and 39 against which the sides of the blade 35 closely fit as shown in Fig. 4. This constuction provides a broad area of contact of the blade against the underside of the neck as best shown in Fig. 4 which per se tends to keep the telescope from rotating. Since the blade 35 is closely fitted between the shoulders 38 and 39, windage movements of the seating member 15 are communicated not only to the telescope but also to the blade 35 thus maintaining the blade accurately beneath the center of the telescope and nullifying any tendency of the telescope to roll.

In assembling the telescope 17 of the gun, it is only necessary to place the telescope on the rear seating number 16 with the bevel 33 against the neck 25 and move the telescope in the direction of the arrow in Fig. 1 so as to compress the spring 32 enough to permit the blade 35 to drop below the neck 24. Upon release of the telescope, spring 32 forces the blade 35 under the neck 24 and urges the vertical surface 34 into contact with the neck and thereby securely holds the telescope 17 in proper position.

From the foregoing, it will be seen that there is here provided a gun telescope mounting embodying windage and elevation adjustments and having yieldable means for detachably clamping the telescope on the gun in proper alignment therewith regardless of the adjusting movements of the mounting.

Although but one form of this invention has been shown and described in detail, it will be understood that other forms are possible and changes may be made in the form and arrangement of parts and substitutions may be made without departing from the spirit of the invention as defined in the appended claims.

I claim:

1. In the gun telescope mounting having a rotatable seat member provided with spaced telescope receiving surfaces connected by a neck, and an anchor member carried by the telescope and urged by a spring into engagement with the neck, the combination of a resilient blade projecting horizontally from the anchor member, a portion on the anchor member having a vertical surface positioned above the blade, the upper face of the blade and said surface being respectively urged into engagement with the under and lateral sides of the neck when the telescope is mounted thereon.

2. In a gun telescope mounting having a bracket secured to the gun, the combination of a seat member rotatably mounted on the bracket and comprising a pair of spaced inclined surfaces for receiving the telescope, means for moving the seat member axially as it is rotated whereby the telescope may be laterally adjusted relative to the gun, said surfaces being connected by a cylindrical neck, an anchor member secured to the telescope and having one end adjacent the bracket, a resilient blade projecting horizontally from the end of the anchor member and extending under and in engagement with the neck, the sides of said blade contacting shoulder portions formed at the respective ends of the neck, whereby the telescope will be held against rotation on the surfaces while the seat member is adjusted.

3. In a gun telescope mounting having a bracket secured to a gun barrel and yieldable attaching means including an anchor member on a telescope by which it is held on the bracket so as to permit adjustments thereof in vertical and horizontal planes, the combination of a horizontal neck positioned on said bracket and spaced from the underside of the telescope, and a resilient blade extending laterally from said anchor member, the blade having a portion extending beneath the neck and coacting therewith to clamp the telescope on the bracket, and means carried by the end of the anchor member for moving said portion toward and away from said neck to adjust the clamping pressure therebetween whereby the telescope is held against rotation in the bracket.

DONALD T. STREET.

REFERENCES CITED

The following references are of record in the file of this patent:

UNITED STATES PATENTS

| Number | Name | Date |
| --- | --- | --- |
| 2,036,290 | McCann | Apr. 7, 1936 |
| 2,125,828 | Turner | Aug. 2, 1938 |
| 2,401,825 | Gruver | June 11, 1946 |
| 2,450,466 | Carlson | Oct. 5, 1948 |
| 2,452,145 | Pike | Oct. 26, 1948 |
| 2,475,383 | Foster | July 5, 1949 |
| 2,510,289 | Livermore | June 6, 1950 |